United States Patent
Visser et al.

(10) Patent No.: US 7,318,354 B2
(45) Date of Patent: Jan. 15, 2008

(54) MAGNETOINDUCTIVE FLOWMETER WITH A TWO-PART INSERT

(75) Inventors: Johannes Cornelius Visser, Sliedrecht (NL); Pieter Herremans, Giessenburg (NL); Alexander Marnix Heijnsdijk, Papendrecht (NL); Graham Roderick Lodge, Cambs (GB); Paul Anthony Johnson, Cherry Hinton (GB)

(73) Assignee: Krohne AG, Basel (CH)

( * ) Notice: Subject to any disclaimer, the term of this patent is extended or adjusted under 35 U.S.C. 154(b) by 0 days.

(21) Appl. No.: 11/352,052

(22) Filed: Feb. 10, 2006

(65) Prior Publication Data
US 2006/0213284 A1    Sep. 28, 2006

(30) Foreign Application Priority Data
Feb. 24, 2005 (DE) .................... 10 2005 008 918
Jan. 3, 2006 (DE) .................... 10 2006 000 814

(51) Int. Cl.
*G01F 1/58* (2006.01)
(52) U.S. Cl. .................................... 73/861.12
(58) Field of Classification Search ............... None
See application file for complete search history.

(56) References Cited

U.S. PATENT DOCUMENTS

| 3,695,104 A | 10/1972 | Mannherz et al. |
| 4,914,950 A * | 4/1990 | Uematsu et al. ......... 73/861.12 |
| 2003/0159522 A1 | 8/2003 | Needham et al. |

FOREIGN PATENT DOCUMENTS

| DE | 4121880 A1 | 1/1993 |
| WO | WO 0047954 A | 8/2000 |

* cited by examiner

*Primary Examiner*—Harshad Patel
(74) *Attorney, Agent, or Firm*—Cesari and McKenna, LLP

(57) ABSTRACT

A magnetoinductive flowmeter for measuring the flow rate of a moving medium includes a measuring tube conducting the medium, and an insert provided in the measuring tube. The insert consists of at least one first part and one second part which first part is introduced into the measuring tube from one end of the measuring tube while the second part, introduced into the measuring tube from the other end of the measuring tube, is joined with the first part in leak-proof fashion. The result is an easy-to-install insert that ensures secure and maintainable retention.

9 Claims, 2 Drawing Sheets

MAGNETOINDUCTIVE FLOWMETER WITH A TWO-PART INSERT

BACKGROUND OF THE INVENTION

1. Field of the Invention

This invention relates to a magnetoinductive flowmeter for measuring the flow rate of a moving medium, with a measuring tube and with an insert provided in said measuring tube for conducting the medium, said insert including at least one first part and one second part of which the first part is introduced into the measuring tube from one end of the measuring tube and the second part, introduced from the other end of the measuring tube, connects to the first part in leak-proof fashion. A magnetoinductive flowmeter of that type has been described earlier in WO 00/47954 A1.

Magnetoinductive flowmeters have been well known for some time and are widely used in various fields of application. The fundamental concept of a magnetoinductive flowmeter goes back to Faraday who in 1832 proposed employing the principle of electromagnetic induction for flow-rate measurements.

According to Faraday's law of induction, a flowing medium containing charge carriers and passing through a magnetic field will generate an electric field intensity perpendicular to the direction of flow and to the magnetic field. In a magnetoinductive flowmeter, Faraday's law of induction is employed in that a field coil serves to generate a magnetic field with a magnetic-field component that extends in a direction perpendicular to the direction of flow. Within this magnetic field, each volume element of the medium flowing through the magnetic field and containing a certain number of charge carriers contributes the field intensity generated in the latter to a measuring voltage that can be collected via measuring electrodes.

2. Background Information

In conventional magnetoinductive flowmeters, these measuring electrodes are designed for contact with the flowing medium either in electroconductive or in capacitive fashion. A salient feature of magnetoinductive flowmeters is the proportionality between the measured voltage and the flow velocity of the medium, averaged across the diameter of the measuring tube, i.e. between the measured voltage and the volume of flux.

It is at least in the area of the measuring electrodes that the interior of the measuring tube must be electrically nonconducting or be provided with an electrically insulating liner. This can be accomplished by means of an insert as referred to above. A magneto-inductive flowmeter featuring this type of insert has been described, for instance, in DE 100 46 195 C2.

According to that document, at least one end section of the insert is elastic while the center section is rigid. The center section consists of a first material and the end section is made from a second material, which second material has a lower modulus of elasticity than does the first material. The insert composed of these materials is prefabricated as a one-piece module that can be introduced into the measuring tube of the magnetoinductive flowmeter by deforming the elastic end section enough to permit being passed through the interior of the measuring tube. After the insert is introduced into the measuring tube and its elastic end section has been passed through the other end of the measuring tube, the elastic section can regain its relaxed state. In this fashion, an insert can be produced with a flange at each end that extends outside the measuring tube and whose outer diameter is larger than the inside diameter of the measuring tube. While introducing an insert of that type in the measuring tube is relatively manageable, it would appear that producing the insert from at least two different materials with mutually different moduli of elasticity poses a problem.

SUMMARY OF THE INVENTION

It is the objective of this invention to present a magnetoinductive flowmeter provided with an insert that is easy to install and displays good durability.

For the magnetoinductive flowmeter referred to in the preamble, this objective is achieved by allowing motion between the first part and the second part in the longitudinal direction.

Thus, according to the invention, the first part and the second part can be longitudinally shifted relative to each other while maintaining their leak-proof connection. This permits easy installation, for instance by simply sliding the two parts into each other while at the same time ensuring that the insert can follow any thermal expansion of the measuring tube without being damaged. The two parts can, therefore, be fabricated from a rigid, dimensionally stable and sturdy material offering high resistance to pressure.

The first part could be brought out at the other end of the measuring tube opposite its point of insertion far enough to permit tight connection with the second part. In a preferred embodiment of the invention, however, the second part as well is inserted into the measuring tube, from the other end of the measuring tube, whereupon the first part and the second part are joined in tight fashion inside the measuring tube.

This connection can essentially be made at any point inside the measuring tube, especially in the central area of the measuring tube. In a preferred embodiment of the invention, however, the first part and the second part are joined near one of the ends of the measuring tube. This not only facilitates installation, but also leaves the central area of the measuring tube available for the unobstructed positioning of the electrodes serving to collect the induced voltage.

In a preferred embodiment of the invention, at least certain sections of the insert consist of an insulating material. It has been found desirable to provide an insulating material in the area of the electrodes over a length of the measuring tube that essentially corresponds to its inner diameter, i.e. the inner diameter of the insert. Of course, it is also possible to produce the entire insert from an insulating material.

It is entirely possible to provide an insert that separates only sections of the inner wall of the measuring tube, for instance in the general area of the electrodes, from the medium flowing through it. In a preferred embodiment of the invention, however, the insert completely separates the measuring tube over its entire length from the medium flowing through it.

As stated further above, the first part and the second part are joined in leak-proof fashion. As an additional measure in a preferred implementation of the invention, a seal is provided between the outside of the first part and, respectively, the outside of the second part and the inner wall of the measuring tube. Particularly suitable for this purpose are O-rings that are seated in matching grooves on the outside of the first part and, respectively, of the second part.

In a preferred embodiment of the invention, a leak-proof connection between the first part and the second part is created by slipping the first part and the second part over one another along an overlapping section. In that overlapping section between the first part and the second part, a seal can be provided, for instance, in the form of an O-ring seated in a groove.

Specifically, a preferred embodiment of the invention provides for the two tubes to be secured to each other by means of catch hooks. These are so designed that they resist separation of the two parts from each other but still permit the relative movement between them in the longitudinal direction.

In general, it may suffice to position the insert in the measuring tube of the magnetoinductive flowmeter without any additional fasteners. In a preferred embodiment of the invention, however, the insert is provided with a torsion lock, for instance, in the form of a friction-engaged or positive-conjugate connection between the outside of the insert and the inner wall of the measuring tube.

It is also generally possible for the first part and the second part to be in full contact with the inner wall of the measuring tube. In a preferred implementation of the invention, however, at least certain sections of the first part and/or second part are positioned at a distance from the inner wall of the measuring tube. Specifically, in a preferred embodiment of the invention, an outer segment of the insert features provisions for accommodating field coils. It is thus possible to install the insert together with field coils in a measuring tube having a plain round cross section without the need for equipping the measuring tube with any additional fixtures for accommodating and mounting the field coils.

Finally, in a preferred embodiment of the invention, the first part and/or the second part is or are each provided with a terminating flange specifically serving to prevent the first or second part from any further movement into the measuring tube, thus ensuring secure retention of the insert in the measuring tube of the magnetoinductive flowmeter.

There are numerous ways in which the magnetoinductive flowmeter according to this invention can be configured and further enhanced. In this connection, attention is invited to the dependent claims and to the following detailed description of a preferred embodiment of the invention with reference to the attached drawings.

DETAILED DESCRIPTION OF AN ILLUSTRATIVE EMBODIMENT

Figure 1A:
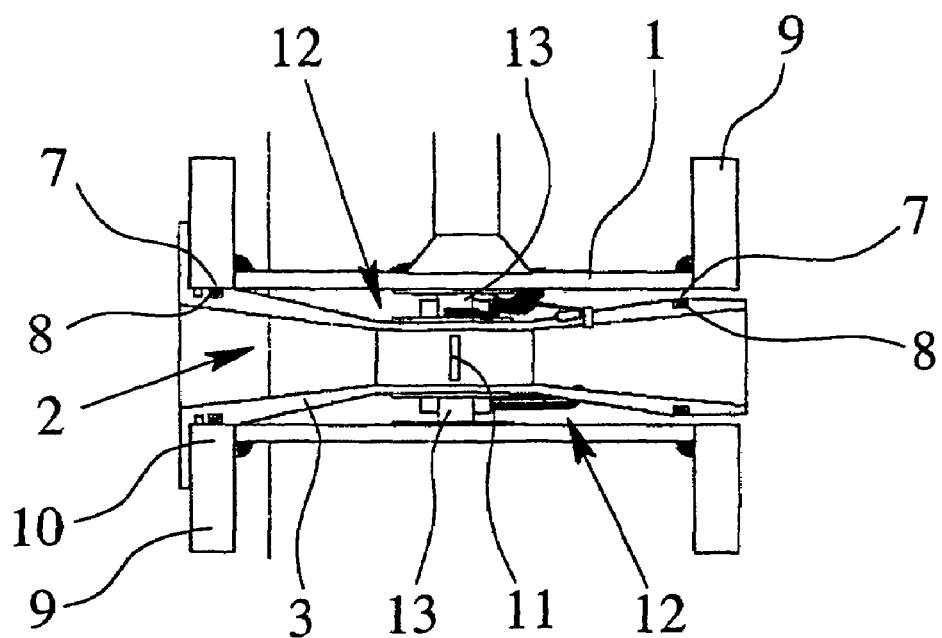
FIGS. 1a and 1b are cross sectionAL illustrations showing the installation of the insert in the measuring tube of a magnetoinductive flowmeter according to a preferred embodiment of the invention.
Figure 1B:
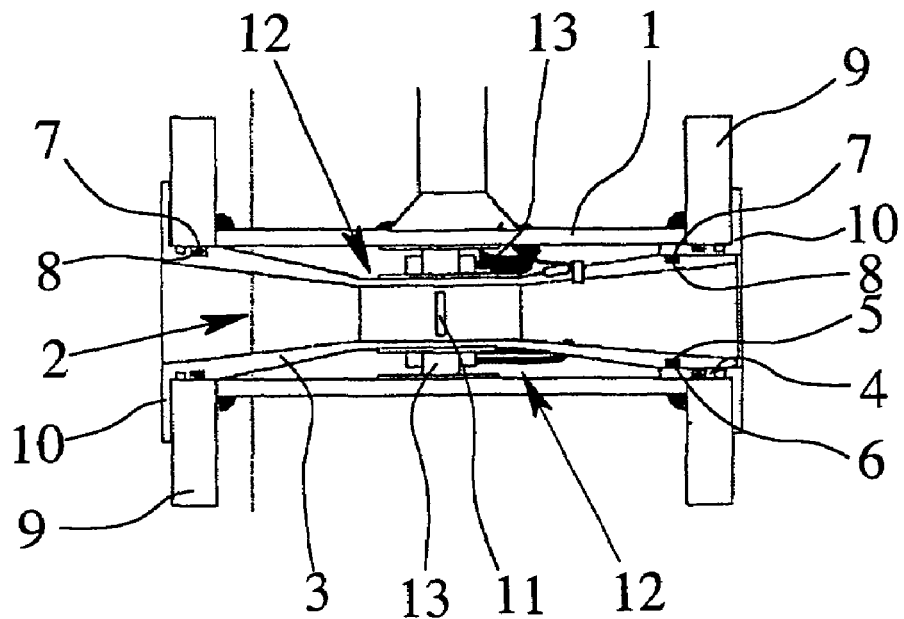

FIGS. 1a and 1b are cross-sectional illustrations of a magnetoinductive flowmeter with a measuring tube 1 in which the insert 2 is introduced. As can be seen in FIG. 1a, the insert 2 encompasses a first part 3 that has been introduced into the measuring tube 1 from the left. The first part 3 extends over the full length of the measuring tube 1. A second part 4 of the insert 2 is introduced into the measuring tube 1 from the right, as shown in FIG. 1b. A section of the second part 4 is pushed on top of the right-hand end of the first part 3, thus permitting the two parts to be joined in tight fashion.

Figure 2:
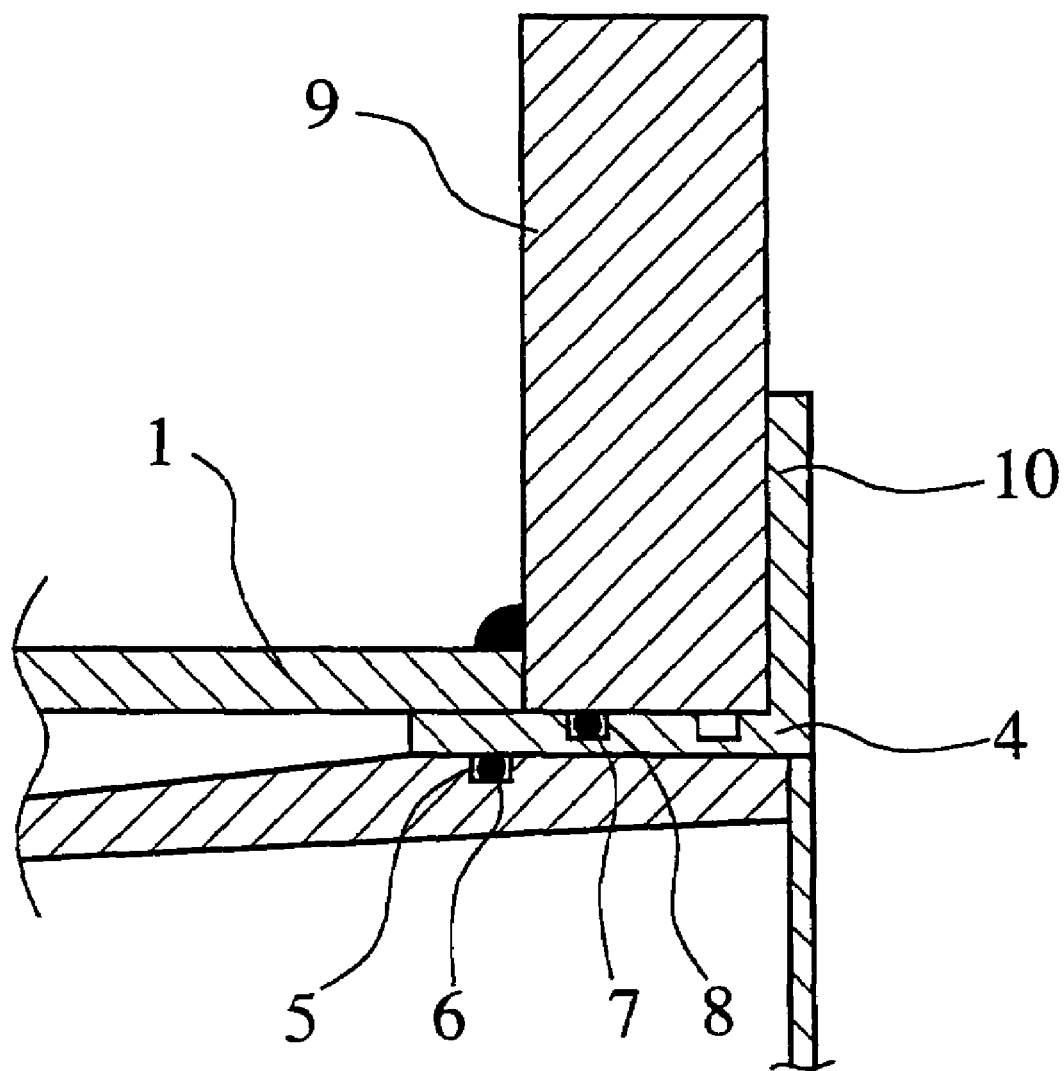
FIG. 2 is a cross-sectional detailed illustration of the FIGS. 1a and 1b flowmeter.

To create a seal between the first part and the second part, a groove 5, provided on the outside of the right-hand end section of the first part 3, accommodates a circumferential O-ring 6 that presses against the inside of the left-hand end of the second part 4, thus creating a seal between the first part 3 and the second part 4. FIG. 2 shows this in more detail.

A seal between the insert 2, consisting of the first part 3 and the second part 4, and the respective end zone of the measuring tube 1 is produced in similar fashion, i.e. by means of O-rings 7 that are seated in grooves 8 on the outside of the first part 3 and the second part 4, respectively.

For installing the magnetoinductive flowmeter according to the preferred embodiment of the invention as described above, each end of the measuring tube 1 is provided with an end flange 9. The outward-pointing ends of the first part 3 and the second part 4 each feature an end flange 10 positioned outside the measuring tube 1 and having an outer diameter that is larger than the inner diameter of the measuring tube 1. This also allows the end flanges 10 of the insert 2 to double as seals against the pipeline system in which the magnetoinductive flowmeter according to the preferred embodiment of the invention here described is installed with the aid of its end flanges 9.

In the magnetoinductive flowmeter according to the embodiment described above and illustrated in the drawing, the only provision made is that the part 3 and the part 4 are pushed into each other along an overlapping section so that, as described above, a leak-proof connection between the two parts 3, 4 can be established. This ensures the ability of the parts 3, 4 to be shifted, i.e. to move relative to each other in the longitudinal direction. In this case, no further means are provided for attaching the parts 3, 4 to each other or to the measuring tube 1. As a result, fabrication and assembly are simplified. However, it is also possible to furnish the parts 3, 4 with connecting elements such as catch hooks whereby the two parts 3, 4 are automatically locked to each other when pushed together. Such a design still permits simple assembly while also ensuring that the two parts 3, 4 cannot easily separate. Finally, it is also possible, as mentioned above, to attach the parts 3, 4 to the measuring tube 1.

As can be seen especially in FIGS. 1a and 1b, the insert 2, in this particular case consisting of injection-molded plastic parts, has a cross section that varies between its intake end and its outlet end along the longitudinal axis of the measuring tube 1. In the central region containing electrodes 11 for collecting the induced voltage, that cross section remains constant. It follows that major segments of the insert 2 inside the measuring tube 1 are positioned at a distance from the inner wall of the latter, thus creating provisions 12 for accommodating field coils 13. This permits the installation of the insert 2 jointly with the field coils 13 in a mechanically sturdy stainless-steel tube having a simple circular cross section.

The result is a magnetoinductive flowmeter with an easy-to-install insert 2 that can be positioned in a conventional stainless-steel measuring tube 1 having a round cross section, allowing the insert 2 to be easily installed jointly with the field coils 13 while at the same time ensuring secure and maintainable retention of the insert 2.

The invention claimed is:

1. A magnetoinductive flowmeter for the flow-rate measurement of a moving medium, with a measuring tube and with an insert provided in said measuring tube for conducting the medium, said insert consisting of at least one first part and one second part, which first part is introduced into the measuring tube from one end of said measuring tube while the second part, introduced into the measuring tube from the other end of said measuring tube, is joined with the first part in leak-proof fashion, wherein the first part and the second part are pushed into each other along an overlapping section, and wherein the first part and the second part permit movement relative to each other in the longitudinal direction while maintaining their leak-proof joint.

2. The magnetoinductive flowmeter as in claim 1, wherein the insert consists of a rigid material.

3. The magnetoinductive flowmeter as in claim 1 or 2, and further including a seal in the overlapping section between the first part and the second part.

4. The magnetoinductive flowmeter as in claim 1 or 2, and further including a seal between the outside of the first part, and, respectively, the second part, and the inner wall of the measuring tube.

5. The magnetoinductive flowmeter as in claim 1 or 2, wherein the insert is provided with a torsion lock.

6. The magnetoinductive flowmeter as in claim 1 or 2, wherein at least certain sections of the first part and/or of the second part are positioned at a distance from the inner wall of the measuring tube.

7. The magnetoinductive flowmeter as in claim 6, wherein the outer region of the insert contains provisions for accommodating magnetic field coils.

8. The magnetoinductive flowmeter as in claim 1 or 2, wherein the first part and/or the second part each include an end flange.

9. The magnetoinductive flowmeter as in claim 1 or 2, wherein the first part and the second part are mutually connected by means of catch hooks.

* * * * *